Aug. 21, 1951          W. B. ALTSHELER          2,565,059
                         PRESSURE CONTROL
                       Filed Oct. 11, 1945
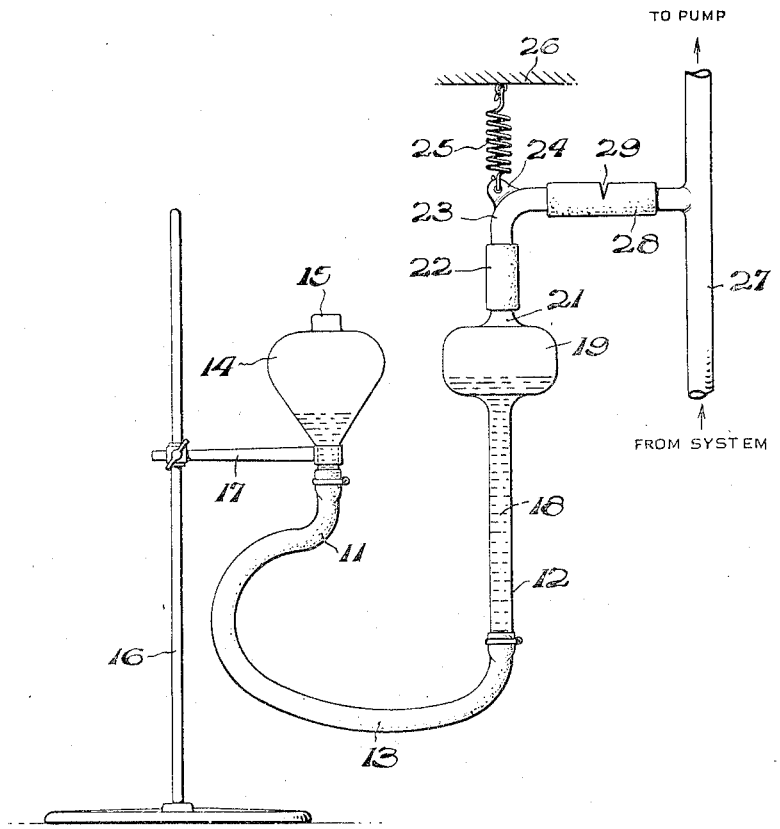
Inventor
William B. Altsheler
By Arthur F. Robert
         Attorney Patented Aug. 21, 1951

2,565,059

UNITED STATES PATENT OFFICE 2,565,059

PRESSURE CONTROL

William B. Altsheler, Louisville, Ky., assignor to Joseph E. Seagram & Sons, Inc., Shively, Ky., a corporation of Indiana Application October 11, 1945, Serial No. 621,821

7 Claims. (Cl. 50—19)

This invention relates to a pressure control, and more particularly to a controller for maintaining a predetermined pressure in a fluid system.

In laboratory activities and control work involving fluid systems such as systems for research in beer stripping under vacuum, it is highly desirable to maintain the system pressure constant or within relatively close limits. This is a major problem in the majority of instances. For instance in a beer stripper, the rate of vaporization in the system fluctuates widely, causing corresponding fluctuations in the pressure in the system. All known pressure controllers intended for such an use have been of the on-off or non-proportionating type and have caused undesirable pressure surges.

In overcoming the aforesaid disadvantages, it is an object of my invention to provide a novel pressure controller capable of maintaining the pressure in a fluid system within relatively close limits, regardless of fluctuations within the system.

A further object of my invention is the provision of a novel pressure control, especially adapted to laboratory work, the control being simple, self-contained and positive in action.

Other objects and advantages will appear from the drawings wherein a vertical elevation of a preferred embodiment of the invention is shown.

The pressure control includes a manometer having an atmospheric leg 11 and a fluid system leg 12, the two being connected through a flexible connection 13, such as rubber tubing. Leg 11 includes a fluid reservoir or chamber 14 for a suitable fluid such as mercury, the reservoir being open to the atmosphere at 15. Leg 11 is supported by a standard 16 or equivalent means arranged to permit vertical adjustment of the leg through a clamp arm 17.

Leg 12 includes a section 18 of substantially constant diameter rising to a fluid chamber 19, rising in turn to a connection 21. A flexible connector 22, which may be rubber tubing, connects connector 21 to the lower end of an elbow 23, the elbow having a lug 24 by which the fluid system leg can be supported by a spring 25 secured to a suitable fixed support 26. The horizontal leg of elbow 23 is connected into the fluid system 27 to be controlled by a flexible connection 28, the latter being provided with a slit or transverse aperture 29 (slightly exaggerated in the drawings) on its upper portion whereby when the connection, which is preferably rubber, is deformed or flexed downwardly, the slit opens and when deformed or flexed upwardly, the slit closes.

In operation, when the system 27 is under vacuum, mercury rises in leg 12 into chamber 19. Due to the relative size of the latter, a small change in level produces a considerable change in weight of the mercury in the chamber. If the pressure in the fluid system is below that for which the control is set, the mercury will continue to rise, increasing the weight of leg 12, causing it to move downward against the action of spring 25, and open slit 29. Air at atmospheric pressure is then bled into the system to bring the pressure up. If the pressure in the fluid system is too high, mercury will be forced out of leg 12, permitting the leg to rise under the influence of spring 25 and close slit 29 until the pump in the system has brought the pressure down.

The amount of bleed through slit 29 is proportional to the degree of flexure of connection 28 so that as the mercury rises in leg 12, a point will be reached at which slit 29 is opened sufficiently to bring the vacuum to a point where it equals the hydrostatic head between the mercury levels in legs 11 and 12. As leg 11 is vertically adjustable, this head can be adjusted to predetermine the system pressure.

By properly proportioning the sizes of the legs, the flexibility of spring 25, and the size of slit 29, the control can be so set that only a small change in the level in chamber 19 will compensate for a considerable change in the pressure in the system, and reduce such changes to negligible amounts.

For laboratory use, legs 11 and 12 may be constructed of glass. For general industrial work, they can be formed of metal and the levels therein be made visible by gauge glasses.

It will be seen that my invention provides a simple, proportionating control that requires no electrical circuits or recirculation of fluid, is positive in action, and capable of compensating for wide and rapid changes in pressure while holding that pressure within very narrow limits.

Having described my invention, I claim:

1. A pressure regulator for a fluid system comprising: a manometer containing liquid and having a first leg fixedly supported and connected to the atmosphere; means to flexibly connect the manometer legs to permit movement of the second leg independent of the first leg; means to support the second leg of the manometer including resilient means arranged to raise and lower the second leg in accordance with the weight of liquid therein; and means to connect the upper end of the second leg to the fluid system to be regulated, the connection including a flexible conduit having a bleed opening in the wall connecting the fluid system with atmosphere and deformed by the vertical movement of the second leg, to thereby vary said bleed opening.

2. The regulator of claim 5 wherein means is provided to raise and lower the atmospheric leg of the manometer relative to the fluid system leg to adjust the pressure in the fluid system.

3. A pressure regulator for a fluid system to regulate fluid therein under less than atmospheric pressure, comprising: a manometer having an atmospheric leg and a fluid system leg, and a flexible connection between the legs whereby each leg can be moved vertically relative to the other leg; vertically adjustable means to support the atmospheric leg; yieldable means to support the fluid system leg and permit its vertical movement in response to changes in level of the liquid therein; and means connecting the fluid system leg and the fluid system comprising a flexible tube having a slit therein communicating with the atmosphere and the fluid system and arranged to be opened and closed by the flexing of the tube in accordance with the vertical movement of the fluid system leg to control the pressure in the fluid system.

4. The regulator of claim 3 wherein the slit is positioned to be opened by downward movement of the fluid system leg and closed by upward movement of the same leg.

5. A pressure regulator for a fluid system comprising: a manometer containing liquid and having a first leg fixedly supported and connected to the atmosphere; means to flexibly connect the manometer legs to permit movement of the second leg independently of the first leg; means to support the second leg of the manometer including resilient means arranged to raise and lower the second leg in accordance with the weight of liquid therein; and means including a flexible conduit to connect the upper end of the second leg to the fluid system to be regulated, and a valve comprising a slit in said conduit arranged to be opened by vertical movement of the second leg in one direction and closed by vertical movement of the leg in the opposite direction.

6. A pressure regulator for a fluid system comprising: a manometer containing liquid and providing a vertically movable leg; resilient means supporting said leg to raise and lower the leg in accordance with the weight of liquid therein; and means connecting the surface of the liquid in said leg and the fluid system with the atmosphere, said means including flexible conduit means having a bleed opening in the wall thereof, whereby a change in pressure in said system changes the liquid level in said leg to move said leg and deform the flexible conduit means to thereby vary the bleed opening.

7. A pressure regulator as specified in claim 6 wherein said leg has an enlarged diameter chamber for liquid at the top thereof.

WILLIAM B. ALTSHELER.

REFERENCES CITED

The following references are of record in the file of this patent:

UNITED STATES PATENTS

| Number | Name | Date |
| --- | --- | --- |
| 411,875 | Ryder | Oct. 1, 1889 |
| 1,744,290 | Weber | Jan. 21, 1930 |
| 2,061,240 | Leins | Nov. 17, 1936 |
| 2,069,105 | Engle | Jan. 26, 1937 |
| 2,161,531 | Rylsky | June 6, 1939 |